United States Patent [19]

Blore et al.

[11] 3,798,643

[45] Mar. 19, 1974

[54] PULSED DOPPLER RADAR

[75] Inventors: William E. Blore; Srbislav V. Zivanovic, both of Goleta, Calif.; Bernard Charest, Ste-Foy, Quebec, Canada

[73] Assignee: The United States of America as represented by the Secretary of the Air Force, Washington, D.C.

[22] Filed: June 27, 1972

[21] Appl. No.: 266,815

[52] U.S. Cl. .............................. 343/8, 343/17.1 R
[51] Int. Cl. .................................................. G01s 9/44
[58] Field of Search ............... 343/8, 171.1 R, 7.3; 333/20

[56] References Cited
UNITED STATES PATENTS

| | | | |
|---|---|---|---|
| 3,001,189 | 9/1961 | Pidhayny | 343/8 |
| 2,525,089 | 10/1950 | Blumlein | 343/8 |
| 3,009,143 | 11/1961 | Clarke | 343/8 |
| 3,028,578 | 4/1962 | Stanton | 343/8 |
| 3,040,311 | 6/1962 | Segerstrom | 343/8 |

Primary Examiner—Maynard R. Wilbur
Assistant Examiner—G. E. Montone

[57] ABSTRACT

A nanosecond pulse doppler radar adapted to hypersonic ballistic range studies is disclosed. The doppler signal is processed to give a continuous record of amplitude and phase using conventional narrow band electronics. The nanosecond pulses transmitted by the radar are obtained through TWT amplification of the amplitude modulated output of a CW X-band oscillator. The received signal is TWT amplified, range-gated with a nanosecond diode modulator and then passed through a local oscillator-mixer-filter system that selects only one PRF line for subsequent narrowband amplification and signal processing.

4 Claims, 1 Drawing Figure

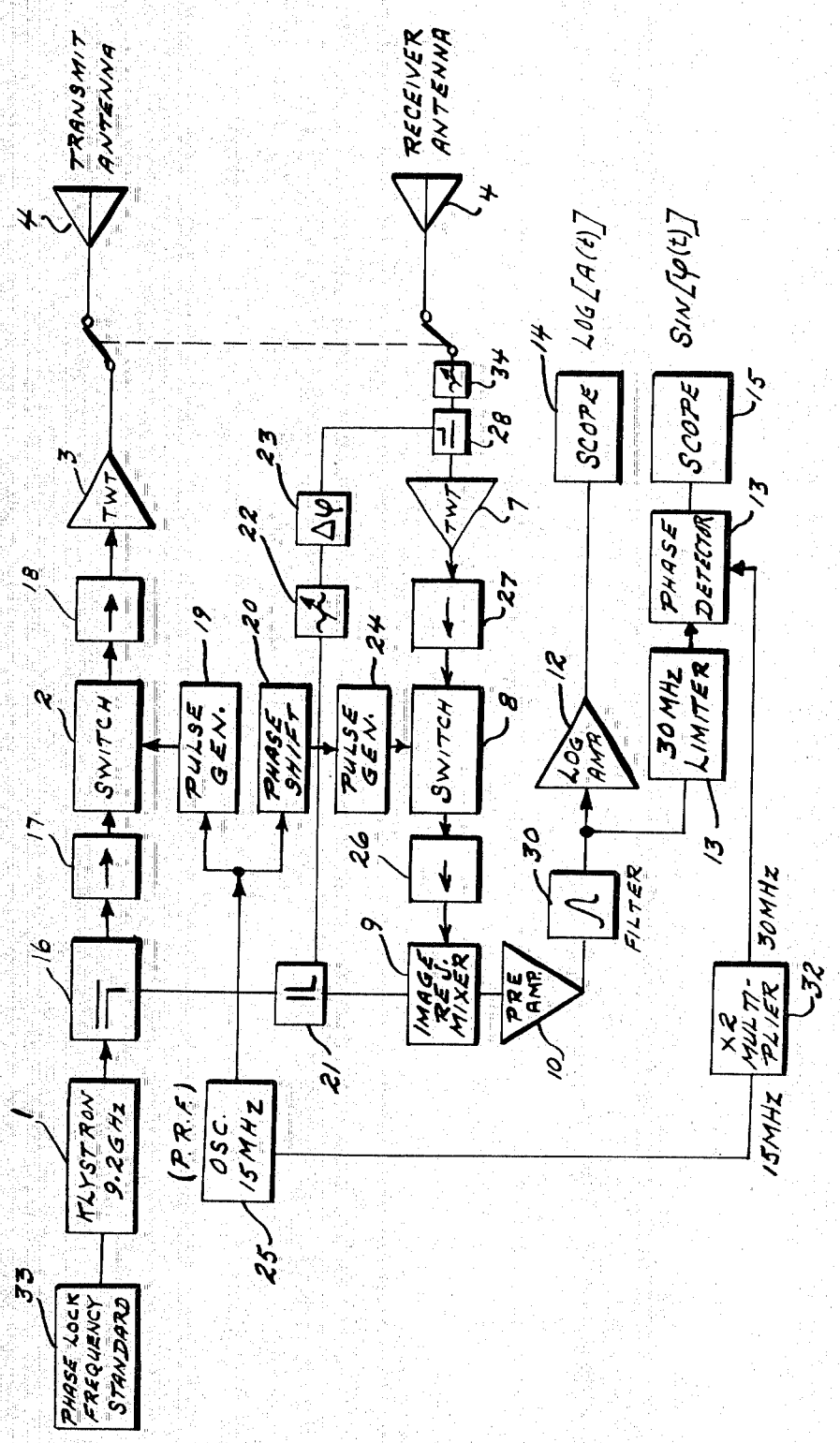

PULSED DOPPLER RADAR

BACKGROUND OF THE INVENTION

This invention relates to pulsed doppler radar systems and in particular to short pulse radars adapted to the detection and measurement of radar observables of hypersonic wake phenomena.

As a ballistic vehicle reenters the earth's atmosphere, a wake, or trail, is formed caused by vehicle drag and kinetic energy dissipation effects. The wake properties are determined by velocity, shape, angle of attack, and altitude of the vehicle, and are affected by dissociation and ionization of the ablation products. Coherent radar techniques permit the measurement of the doppler power spectra, as well as the radar cross section of the wake. The doppler power spectrum provides a measure of the kinetic energy in the wake as a function of velocity, as determined by the degree of turbulence, and the radar cross section provides a measure of the degree of ionization in the wake. Thus radar observables are of great potential value in the study of hypersonic wake phenomena.

By way of background, CW doppler radar instruments have been used for some time to measure wake properties in ballistic ranges and to study properties of plasmas in the laboratory, where they have provided large quantites of very useful data. Depending upon the specific application, however, a short-pulse doppler radar may offer some significant, characteristic advantage relative to CW doppler radar. In particular, the characteristically high range resolution and multiple receiver range gate capabilities of the pulse doppler radars permit simultaneous doppler measurements (including radar cross section) on closely spaced, isolated regions in the wake within the antenna beam-width, and thus permit detailed correlation of doppler radar observables from separate prescribed regions in the wake. In a wake of a suitably large model, it is possible, for example, to simultaneously measure wake doppler center line and front velocities by appropriate placement of the radar range gates in the corresponding wake radial regions.

Other advantages of a short pulse doppler radar are: (1) the ability to isolate and track a cloud of scatterers in range, (2) capability to gate out background interference, and (3) isolation of the transmitter signal from the doppler receiver input. Using conventionally known techniques, it is not practicable to reduce background return of a ground-based wake test facility (e.g., shock tunnel and ballistic ranges) to the noise threshold of a sensitive CW receiver by the treatment of the test environment with radar absorber material alone, and to provide adequate electrical isolation between transmitter output and receiver input. These problems, characteristic of a CW radar, can be greatly alleviated or eliminated with a pulse doppler radar.

SUMMARY OF THE INVENTION

An X-band CW klystron, phase-locked to a low frequency crystal standard produces a CW signal at about +10 dbm level. This signal is amplitude modulated by a diode switch to produce one-nanosecond pulses at 15 MHz rate with a 30 db on-off ratio. These pulses are amplified to a 20-watt peak pulse power level by a transmitter TWT and fed to a low-sidelobe transmitting antenna. The reflected signal from the wake is fed from a low sidelobe receiving antenna, through a precision calibration attenuator to a receiving TWT where it is amplified to a maximum signal level of +10 dbm, and passed through the receiver range gate switch. The occurrence time of the receiver gate pulse determines the position in space of the receiver range gate.

Following this gate is a narrow-band image-rejection mixer followed by a narrow-band 30 MHz preamplifier and IF amplifier, driving in parallel a logarithmic amplifier and a limiter-phase detector. The outputs of two units are then displayed on conventional oscilloscopes. The output of the 30 MHz preamplifier is a CW signal with amplitude proportional to wake Radar Cross Section and to the average power per line in the RF pulse. The phase is proportional to model doppler velocity. The rate at which the CW signal can change to follow changes in the wake is determined by the IF amplifier bandwidth.

It is a principal object of the invention to provide a new and improved pulsed doppler radar.

It is another object of the invention to provide an extremely short pulse doppler radar suitable for detection and measurement of radar observables in hypersonic wake phenomena.

It is another object of the invention to provide an improved pulsed doppler radar having high range resolution and multiple receiver range gate capabilities.

It is another object of the invention to provide an improved pulsed doppler radar having the ability to isolate and track a cloud of scatterers in range.

It is another object of the invention to provide an improved pulsed doppler radar having the capability of gating out background interferences.

These, together with other objects, advantages and features of the invention will become more apparent from the following detailed description when taken in conjunction with the illustrative embodiment in the accompanying drawing.

DESCRIPTION OF THE DRAWINGS

The sole FIGURE of the drawing is a block diagram of a nanosecond pulse radar incorporating the principles of the present invention.

DETAILED DESCRIPTION OF THE PREFERRED EMBODIMENT

Referring now to the block diagram of the pulse radar as shown in FIG. 1, X-band CW klystron 1, phase-locked to a low frequency crystal standard 33 with a commercially available phase-locking unit, produces a CW signal at about +10 dbm level. This signal is amplitude-modulated by diode switch 2, to produce one-nanosecond pulses at a 15 MHz rate with a 30 db on-off ratio. These pulses are amplified to a 20-watt peak pulse power level by transmitter TWT 3, and fed to low-sidelobe transmitting antenna 4. The reflected signal from the radar target is fed from low-sidelobe receiving antenna 4 through precision calibration attenuator 34 to receiving TWT 7 where it is amplified to a maximum signal level of +10 dbm, and passed through receiver range gate switch 8. Although separate transmitting and receiving antennas are shown a single transmit/receive antenna can of course be used. The occurrence time of the receiver gate pulse relative to the transmitted pulse is determined by phase shifter 20, since both transmitted and receiver gate pulses were produced in pulse generators 19, 24 that are driven by common PRF oscillator 25 at the same 15 MHz pulse repetition frequency. Diode switch 2 and range gate switch 8 are each nanosecond pulse modulators of the type disclosed by our copending patent application entitled, Nanosecond Pulse Modulator, Ser. No. 266,811 now U.S. Pat. No. 3,735,146, filed on even date herewith and herein incorporated by reference. Pulse generators 19 and 24 are each video pulse generators of the type disclosed in our copendijng application entitled, Stripline Video Pulse Generator, Ser. No. 266,816 now U.S. Pat. No. 3,764,830, filed on even date herewith and herein incorporated by reference.

Following this gate is narrow-band image-rejection mixer 9 followed by narrow-band 30 MHz preamplifier 10 driving in parallel logarithmic amplifier 12 and limiter-phase detector 13. The output of the 30 MHz preamplifier 10 is a CW signal with amplitude proportional to wake Radar Cross Section and to the average power per line in the RF pulse. The phase is proportional to model doppler velocity. The rate at which the CW signal can change to follow changes in the wake is determined by the preamplifier-filter bandwidth.

Waveguide isolators 17, 18, 26 and 27 have the function of inhibiting propagation of spurious signals generated in the transmitter and receiver switches.

A directional coupler 16 feeds some of the transmitted signal to image-rejection mixer 9 as local oscillator power. Another directional coupler 21 feeds some transmitted attenuator 22, phase shifter 23 and directional coupler 28, back into the front end of the receiver. This signal is used to cancel nonmoving reflections from the interior of the ballistics range which would otherwise overload the receiver. Multiplier 32 multiplies the 15 MHz PRF frequency to 30 MHz for use as a phase reference in the 30 MHz receiver-phase-detector.

Although the present invention has been described with reference to a specific embodiment, it is not intended that the same should be taken in a limiting sense. Accordingly it is understood that the scope of the invention in its broader aspects is to be defined by the appended claims only and no limitation is to be inferred from definite language used in describing the preferred embodiment.

We claim:

1. A pulsed doppler radar system comprising
a CW electromagnetic wave source,
a frequency standard phase locked thereto,
a PRF oscillator,
a transmit/receive antenna,
amplitude modulation means connected to said PRF oscillator, the output of said CW electromagnetic wave source and to said transmit/receive antenna, said amplitude modulation means comprising a nanosecond pulse modulator and a stripline video pulse generator, said nanosecond pulse modulator being connected in series between said CW electromagnetic wave source and the transmit side of said transmit/receive antenna, and said strip-line video pulse generator being connected to actuate said nanosecond pulse modulator in response to the output of said PRF oscillator,
a receiver range gate connected to said transmit/receive antenna,
a phase shifter connected to said PRF oscillator and to said receiver range gate,
a narrow-band image-rejection mixer connected to the output of said CW electromagnetic wave source and to the output of said receiver range gate, said receiver range gate comprising a nanosecond pulse modulator and a stripline video pulse generator, said nanosecond pulse modulator being connected in series between said image-rejection mixer and the receive side of said transmit/receive antenna, and said stripline video pulse generator being connected to actuate said nanosecond pulse modulator in response to the phase shifted output of said PRF oscillator,
a logarithmic amplifier connected to the output of said image-rejection mixer, and
a limiter-phase detector connected in parallel with said logarithmic amplifier to the output of said image-rejection mixer and to said PRF oscillator.

2. A pulsed doppler radar system as defined in claim 1 including means for displaying the output of said logarithmic amplifier and means for displaying the output of said limiter phase detector.

3. A pulsed doppler radar system as defined in claim 2 including an attenuator and a phase shifter connected in series between the receive side of said transmit/receive antenna and said CW electromagnetic wave source.

4. A pulsed doppler radar system as defined in claim 3 including filter means connected between said image rejection mixer and said logarithmic amplifier.

* * * * *